United States Patent
Katayama et al.

(10) Patent No.: US 10,532,742 B2
(45) Date of Patent: Jan. 14, 2020

(54) VEHICLE CONTROL SYSTEM

(71) Applicant: HONDA MOTOR CO., LTD., Tokyo (JP)

(72) Inventors: Hirotaka Katayama, Wako (JP); Yasushi Ueda, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 244 days.

(21) Appl. No.: 15/816,040

(22) Filed: Nov. 17, 2017

(65) Prior Publication Data
US 2018/0141553 A1    May 24, 2018

(30) Foreign Application Priority Data

Nov. 24, 2016    (JP) ................................ 2016-227481

(51) Int. Cl.
*B60W 10/20*    (2006.01)
*B60W 30/18*    (2012.01)
*B60W 10/06*    (2006.01)

(52) U.S. Cl.
CPC ...... *B60W 30/18054* (2013.01); *B60W 10/06* (2013.01); *B60W 10/20* (2013.01);
(Continued)

(58) Field of Classification Search
CPC ........... B60W 30/18054; B60W 10/06; B60W 10/20; B60W 2422/50; B60W 2510/0642;
(Continued)

(56) References Cited

U.S. PATENT DOCUMENTS

| 7,349,770 B2 * | 3/2008 | Matsuzaki | ............ B60W 10/06 701/1 |
| 7,983,833 B2 * | 7/2011 | Sugai | ..................... B60K 6/445 701/112 |

(Continued)

FOREIGN PATENT DOCUMENTS

| JP | 2005247171 A | 9/2005 |
| JP | 2006103580 A | 4/2006 |

(Continued)

OTHER PUBLICATIONS

Wang et al., Driver-vehicle closed-loop simulation of differential drive assist steering control system for motorized-wheel electric vehicle, 2009, IEEE, p. 564-571 (Year: 2009).*

(Continued)

*Primary Examiner* — McDieunel Marc
(74) *Attorney, Agent, or Firm* — Armstrong Teasdale LLP (57) ABSTRACT

In a steer by wire and idle stop vehicle, idle stop conditions for invoking an idle stop operation include that the traveling speed of the vehicle has fallen below a first value (10 km/h). When the vehicle speed is lower than the first value but higher than a second value (5 km/h), a steering actuator control unit 44 executes a position keep control whereby a steering motor 29 is electrically braked, and a reaction force actuator control unit 43 operates a reaction force motor 26 as a dynamic brake. When the vehicle speed has fallen below the second value in the idle stop operation, the steering motor control unit terminates the position keep control.

12 Claims, 7 Drawing Sheets

(52) U.S. Cl.
CPC . *B60W 2422/50* (2013.01); *B60W 2510/0642* (2013.01); *B60W 2510/20* (2013.01); *B60W 2520/04* (2013.01); *B60W 2520/10* (2013.01); *B60W 2540/18* (2013.01); *B60W 2710/065* (2013.01); *B60W 2710/20* (2013.01)

(58) Field of Classification Search
CPC ......... B60W 2510/20; B60W 2510/04; B60W 2510/10; B60W 2510/18; B60W 2710/065; B60W 2710/20
See application file for complete search history.

(56) References Cited

U.S. PATENT DOCUMENTS

| | | | |
|---|---|---|---|
| 9,573,617 B2* | 2/2017 | Shibuya | B60W 10/02 |
| 9,688,301 B2* | 6/2017 | Shibuya | B60W 10/02 |
| 10,233,888 B2* | 3/2019 | Kuramochi | F02N 11/0822 |

FOREIGN PATENT DOCUMENTS

| | | |
|---|---|---|
| JP | 2007320537 A | 12/2007 |
| JP | 2014201269 A | 10/2014 |

OTHER PUBLICATIONS

Mir et al., Role of electronics and controls in steering systems, 2003, IEEE, p. 2859-2864 (Year: 2003).*

Jang et al., A control of vehicle using steer-by-wire system with hardware-in-the-loop-simulation system, 2003, IEEE, p. 389-394 (Year: 2003).*

Yin et al., Modification of vehicle handling characteristics via steer-by-wire, 2005, IEEE, p. 965-976 (Year: 2005).*

* cited by examiner

VEHICLE CONTROL SYSTEM

TECHNICAL FIELD

The present invention relates to a vehicle control system, and in particular, to a vehicle control system for a vehicle incorporated with a steer by wire device and configured to perform an idle stop operation.

BACKGROUND ART

Currently marketed passenger vehicles are often equipped with a steer by wire steering device in which front wheels are mechanically decoupled from a steering wheel, and steered by a steering actuator in response to the operation of the steering wheel. In a steer by wire steering device, a steering unit having a steering actuator for turning the front wheels and a reaction force actuator for applying a steering reaction force to a steering wheel is provided. In order to allow the steering operation to be performed at the time of a failure, the steering unit and the steering wheel can be connected to each other via a clutch which is normally disengaged but can be engaged when required.

In such a steer by wire device, if the steering wheel is turned when the vehicle is stationary, the steering actuator consumes a significant amount of electric power. To avoid this problem, the steering actuator may be disconnected when the vehicle is stationary. To prevent the steering wheel from being readily turned while the vehicle is stationary, the steering wheel may be locked by supplying electric power to an electromagnetic clutch that engages the input end of the steering shaft to a fixed part. See JP2005-247171A, for instance.

JP2006-103580A discloses a steering control system in which the steering actuator is configured to act as a dynamic brake to keep the steering angle fixed and enable the vehicle to maintain a straight course by controlling a bridge circuit connected to the steering actuator in an appropriate manner. A dynamic brake is achieved by electrically short-circuiting two ends of the motor via a resistor.

JP2007-320537A discloses a steering assist motor that absorbs the impact of a vehicle crash by supplying electric current to the stator coil of the steering assist motor to produce an attractive force between the stator and the rotor.

When an electromagnetic clutch is used to lock the steering shaft when the vehicle is stationary, electric current is still required to be supplied to the electromagnetic clutch either to keep the clutch engaged or disengaged. More importantly, completely locking the steering shaft may cause discomfort to the vehicle operator.

The steering system disclosed in JP2006-103580A is a steering assist system, and is therefore not applicable to a steer by wire system.

SUMMARY OF THE INVENTION

In view of such problems of the prior art, a primary object of the present invention is to provide a vehicle control system with an idle stop function that can minimize the power consumption of a steering system thereof, avoid unnecessary interruption of an idle stop operation, and minimize a deviation between a steering input from a steering wheel and a steering angle of steered wheels.

The present invention achieves such an object by providing a control system (40) for a vehicle incorporated with a steer by wire steering device for steering a road wheel (3) by using a steering motor (29) according to a steering input applied to a steering member (11), the steering motor being mechanically decoupled from the steering member, the control system comprising: an idle strop control unit (41) for starting an idle stop operation to stop an engine mounted on the vehicle when a plurality of prescribed idle stop conditions are satisfied, and restarting the engine when a prescribed restart condition is satisfied; a steering input angle sensor (31) for detecting a steering input angle of the steering member; a reaction force motor for supplying a steering reaction force to the steering member; a steering output angle sensor (33-35) for detecting a steering output angle of the road wheel; a vehicle speed sensor (36) for detecting a traveling speed of the vehicle; a steering motor control unit (44) for controlling the steering motor so as to cause the road wheel to be steered at an angle commanded by the steering input angle of the steering member; and a reaction force motor control unit (43) for controlling the reaction force motor to generate a reaction force applied to the steering member; wherein the idle stop conditions include that the traveling speed of the vehicle detected by the vehicle speed sensor has fallen below a first value; and wherein, when the vehicle speed is lower than the first value but higher than a second value which is lower than the first value in the idle stop operation, the steering motor control unit executes a position keep control whereby the steering motor is electrically braked, and the reaction force motor control unit operates the reaction force motor as a dynamic brake.

This arrangement allows the steering angle of the road wheel to be kept substantially fixed when the vehicle speed is between the first and second values in an early part of the idle stop operation by having the steering motor control unit perform the position keep control. The position keep control may be performed by supplying electric current to the steering motor so as to provide a braking force, or, alternatively, by operating the steering motor as a dynamic brake. Thereby, the road wheel is prevented from being steered at the start of the idle stop operation so that the deviation between the steering angle of the steering member and the steering angle of the road wheel can be minimized, and unnecessary canceling of the idle stop operation (which can occur as a result of a steering angle change greater than a prescribed threshold value) can be avoided.

Typically, the first value and the second value are greater than zero.

Preferably, when the vehicle speed has fallen below the second value in the idle stop operation, the steering motor control unit terminates the position keep control.

Thereby, the supply of electric current to the steering motor can be terminated once the vehicle speed falls below the second value so that the power consumption by the steering motor is minimized. At this stage, the vehicle speed is so low that the resistance to the steering operation caused by the friction with the road surface is significant, and this minimizes any inadvertent steering movement of the road wheel.

At this time, the reaction force motor control unit may continue to operate the reaction force motor as a dynamic brake.

Thereby, the deviation between the steering angle of the steering member and the steering angle of the road wheel can be minimized over the entire duration of the idle stop operation.

According to a preferred embodiment of the present invention, the restart condition includes a change of the steering input or output angle from a start of the idle stop operation being greater than an engine restart threshold value, and, if an absolute value of the steering input or output angle at the start of the idle stop operation is equal to or greater than a prescribed value, the engine restart threshold value for a steering operation to increase the steering input angle is given as a first value, and the engine restart threshold value for a steering operation to decrease the steering input angle is given as a second value smaller than the first value.

According to this arrangement, when the driver of the vehicle should turn the steering wheel while the vehicle is stationary in an idle stop operation, the idle stop operation is terminated if the change of the steering input angle from a start of the idle stop operation is greater than an engine restart threshold value, and this engine restart threshold value is varied depending on the direction of the change of the steering input angle from the start of the idle stop operation.

If the change of the steering input angle is in the direction to increase the steering angle from the value at the start of the idle stop operation, the engine restart threshold value is raised. This is advantageous because the driver of the vehicle is likely to anticipate an increase in the steering angle upon termination of the idle stop operation, and the saving of electric power consumption by the steering actuator can be maximized Conversely, if the change of the steering input angle is in the direction to decrease the steering angle from the value at the start of the idle stop operation, the engine restart threshold value is lowered. This is advantageous because the driver of the vehicle is not likely to anticipate a decrease in the steering angle upon termination of the idle stop operation, and is thereby prevented from experiencing any undesired impression although the saving of electric power consumption by the steering actuator can be slightly decreased.

If the absolute value of the steering input or output angle at the start of the idle stop operation is smaller than the prescribed value, the engine restart threshold value may be given as a base value intermediate between the first value and the second value.

If the absolute value of the steering input or output angle at the start of the idle stop operation is relatively small, the driver of the vehicle is not likely to be annoyed by the steering behavior of the vehicle upon termination of an idle stop, there may be no need to consider the steering angle at the start of the idle stop operation in determining the engine restart threshold value, and a relatively large value may be assigned to the engine restart threshold value without any problem.

According to a preferred embodiment of the present invention, the first value and the second value are fixed values without regard to the absolute value of the steering input or output angle at the start of the idle stop operation.

Thereby, the system configuration can be simplified.

More preferably, the first value increases with an increase in the absolute value of the steering input or output angle at the start of the idle stop operation, and/or the second value decreases with an increase in the absolute value of the steering input or output angle at the start of the idle stop operation.

Thereby, the transition in the behavior of the steering device can be made smoother.

DESCRIPTION OF THE PREFERRED EMBODIMENT(S)

A preferred embodiment of the present invention is described in the following with reference to the appended drawings.

Figure 1:
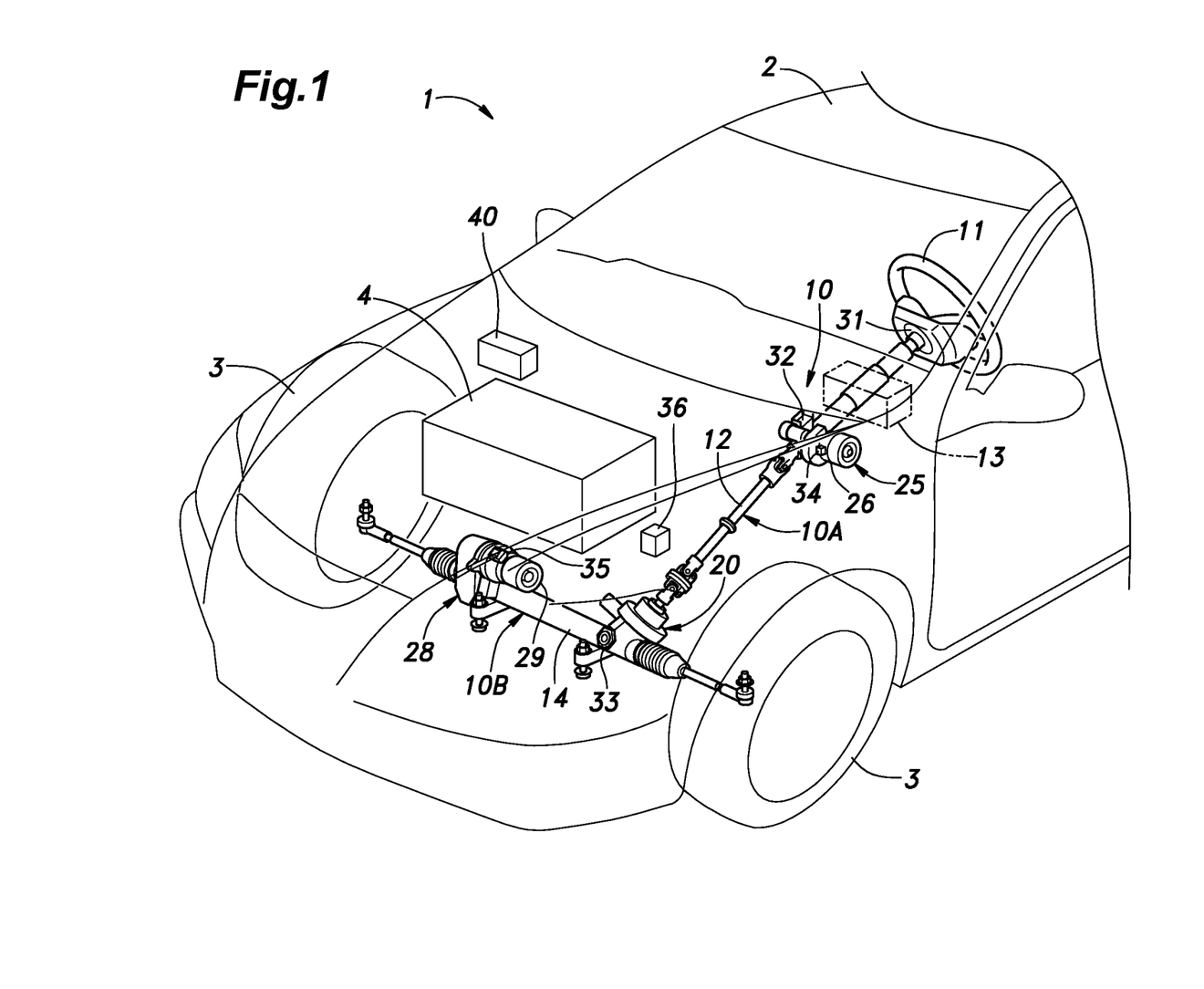
FIG. 1 is a see-through schematic perspective view of a front part of a vehicle according to an embodiment of the present invention.

FIG. 1 is a see-through schematic perspective view of a front part of a vehicle according to an embodiment of the present invention. The vehicle 1 consists of a four-wheeled vehicle including a pair of front wheels 3 supported by a vehicle body 2 so as to be steerable via respective front suspension systems. An engine room is formed in the front part of the vehicle body 2, and a cabin is formed behind the engine room. An internal combustion engine 4 for powering the front wheels 3 is housed in the engine room. A driver's seat is provided on a front left side part of the cabin, and a steering device 10 for steering the front wheels 3 is provided between the driver's seat and the front wheels 3.

The steering device 10 includes a steering wheel 11 (or a steering member) arranged in front of the driver's seat to receive a steering input from the driver. A steering shaft 12 is integrally and centrally attached to the steering wheel 11 to extend forward and downward, and is rotatably supported by the vehicle body 2 via a steering column support 13. The steering shaft 12 extends beyond the steering column support 13, and is connected, at the lower end thereof, to a rack and pinion steering gear box 14 via a clutch 20.

Figure 2A:
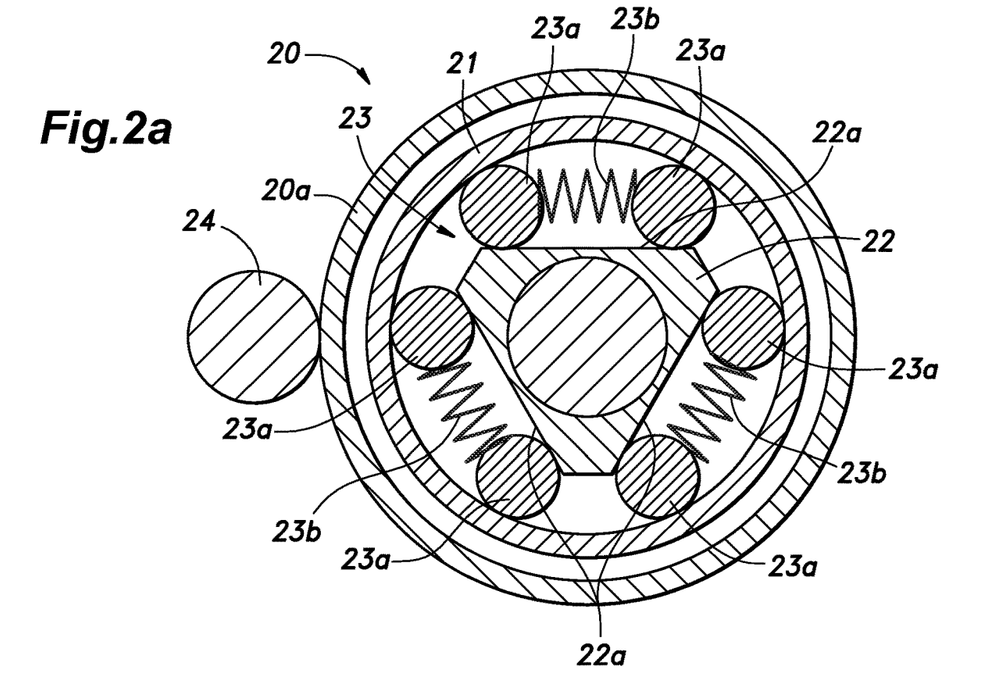
FIG. 2a is a sectional view of a clutch shown in FIG. 1 when the clutch is disengaged.
Figure 2B:
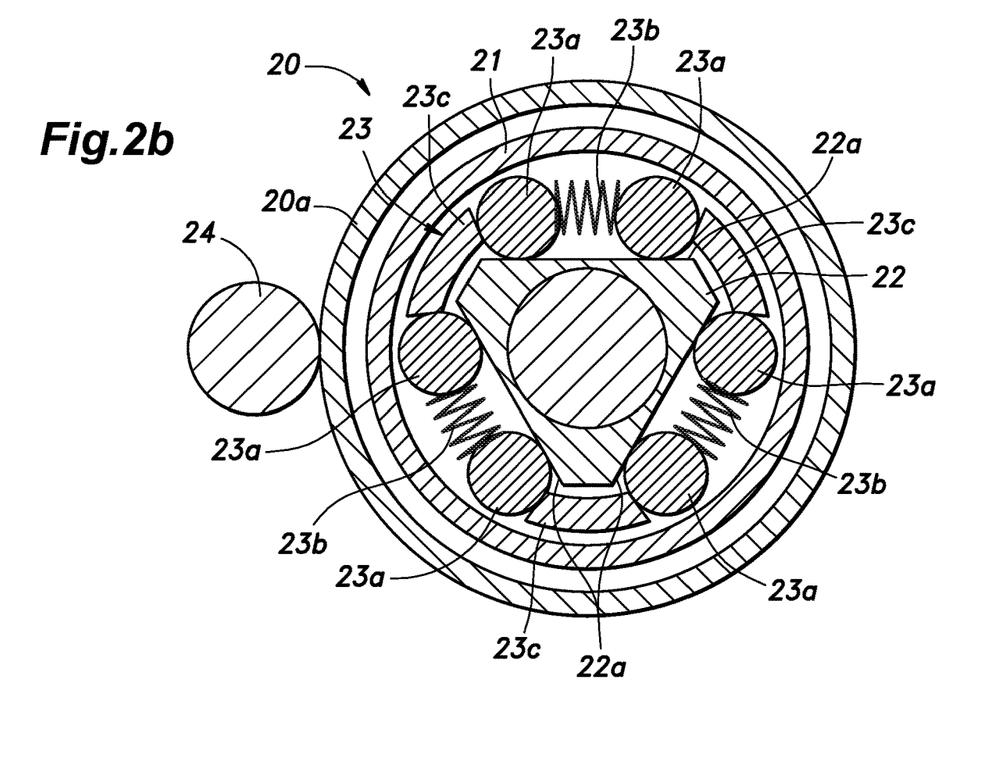
FIG. 2b is a view similar to FIG. 2a when the clutch is engaged.

FIGS. 2a and 2b are sectional views of the clutch 20 when the clutch is disengaged and engaged, respectively. The clutch 20 includes an input member 21 consisting of a cylindrical member, an output member 22 consisting of a rod member formed with a cam profile and surrounded by the input member 21, a switch mechanism 23 for selectively engaging the input member 21 and the output member 22 with each other, a solenoid device 24 for actuating the switch mechanism 23, and a cylindrical clutch case 20a housing these components therein in a coaxial manner. In this clutch 20, the input member 21 and the output member 22 are interchangeable.

The input member 21 and the output member 22 are rotatably supported by the clutch case 20a. The output member 22 is provided with a substantially triangular prism shape in cross section so that the cam profile defined by the output member 22 includes three trapezoidal projections (or projections each having flattened apex) projecting radially from the output member 22 in cross sectional view. For the details of this clutch 20, reference may be made to JP5840168B.

The switch mechanism 23 includes six rollers 23a interposed between the inner circumferential surface of the input member 21 and planar sections of the cam profile, three spring members 23b each urging the corresponding pair of rollers 23a on the corresponding planar section of the cam profile away from each other, and three wedge members 23c positioned in the respective spaces defined by the rollers 23a belonging to the different planar sections of the cam profile. The wedge members 23c are commonly connected to a base member (not shown in the drawings) which can be selectively actuated in the axial direction by the solenoid device 24. Each wedge member 23c is tapered in the axial direction.

The solenoid device 24 is configured to axially move the wedge members 23c between an engaged position where the two rollers 23a on each planar section of the cam profile are pushed against the opposing inner wall surface of the input member 21 under the spring force of the corresponding spring member 23b (as shown in FIG. 2a) without the wedge members 23c acting upon the rollers 23a, and a disengaged position where the two rollers 23a on each planar section of the cam profile are pushed toward each other by the corresponding wedge members 23c pushing the two rollers 23a toward each other against the spring force of the corresponding spring member 23b (as shown in FIG. 2b).

When the solenoid device 24 is not energized, the wedge members 23c do not act upon the rollers 23a (the engaged position) as shown in FIG. 2a so that the input member 21 and the output member 22 are held rotationally fast to each other owing to the intervention of the rollers 23a between the two members. When the solenoid device 24 is energized, the wedge members 23c push the rollers 23a away from the inner circumferential surface of the input member 21 (the disengaged position) as shown in FIG. 2b so that the input member 21 and the output member 22 are freely rotatable relative to each other.

As shown in FIG. 1, a part of the steering shaft 12 above the clutch 20 is provided with a reaction force actuator 25 consisting of an electric motor or a reaction force motor 26 for supplying a steering reaction force (torque) to the steering wheel 11 when the clutch 20 is disengaged.

The reaction force motor 26 is connected to a per se known bridge circuit which can function as a dynamic brake by selectively forming a closed circuit including the motor coils and a resistor. When the reaction force motor 26 operates as a dynamic brake, a brake torque proportional to the rotational speed of the steering wheel 11 is produced.

The steering gear box 14 is provided with a steering actuator 28 which applies a steering torque in response to the steering input from the steering wheel 11 when the clutch 20 is disengaged. The steering actuator 28 includes a steering motor 29 consisting of an electric motor for supplying a steering torque (possibly in the form of a thrust force) to the rack of the steering gear box 14.

When the clutch 20 is engaged, the reaction force actuator 25 and/or the steering actuator 28 supplies an assist torque corresponding to the steering input from the steering wheel 11 to the steering shaft 12 or the rack. When the clutch 20 is engaged, the steering angle $\Theta$ (steering output angle) of the front wheels 3 is proportional to the steering angle $\theta$ (steering input angle) of the steering wheel 11.

When the clutch 20 is disengaged, the steering angle $\Theta$ of the front wheels 3 is determined as a mathematical function of the steering angle $\theta$ of the steering wheel 11 which may take into account the vehicle speed and other factors. In particular, the steering wheel 11 is mechanically disconnected from the front wheels 3 so that the steering system consists of a steer by wire system.

A steering angle sensor 31 for detecting the steering angle $\theta$ of the steering wheel 11 is provided in an upper part of the steering shaft 12, and a torque sensor 32 for detecting a steering torque T applied to the steering wheel 11 is provided in a part of the steering shaft 12 located above the reaction force actuator 25. The steering gear box 14 is provided with a pinion angle sensor 33 for detecting the rotational angle P$\theta$ of the pinion. The reaction force actuator 25 is provided with a rotation angle sensor 34 (resolver) for detecting the rotational angle M$\theta$ of the electric motor. The steering actuator 28 is further provided with a stroke sensor 35 for detecting the stroke S of the rack. The vehicle 1 is further provided with a vehicle speed sensor 36 for detecting the traveling speed V of the vehicle 1. Detection signals of these sensors 31 to 36 are forwarded to a control unit 40 provided in a suitable part of the vehicle 1.

The rotational angle P$\theta$ of the pinion detected by the pinion angle sensor 33 and the stroke S of the rack detected by the stroke sensor 35 correspond to the steering angle $\Theta$ of the front wheels 3 in a fixed relationship. Further, as described above, when the clutch 20 is engaged, the steering angle $\Theta$ of the front wheels 3 corresponds to the steering angle $\theta$ of the steering wheel 11 in a fixed relationship, and when the clutch 20 is in the disengaged state, the steering angle $\Theta$ is related to the steering angle $\theta$ in a relationship controlled by the control unit 40.

Figure 3:
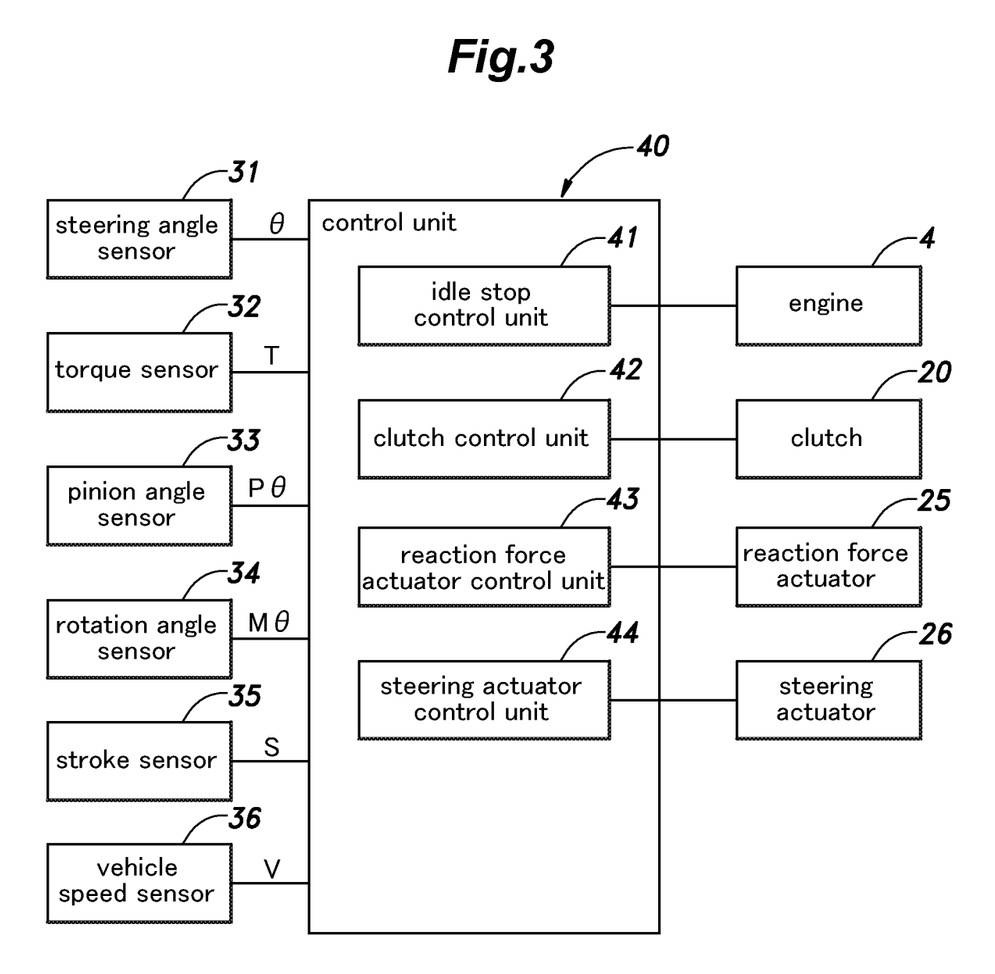
FIG. 3 is a functional block diagram of a control system shown in FIG. 1.

FIG. 3 is a functional block diagram of the control unit 40. The control unit 40 consists of an electronic circuit unit including a CPU, RAM, ROM and an input/output interface. As discussed above, the sensor signals are forwarded to the control unit 40 from the steering angle sensor 31, the torque sensor 32, the pinion angle sensor 33, the rotation angle sensor 34, the stroke sensor 35, and the vehicle speed sensor 36. The control unit 40 includes, as functional units, an idle stop control unit 41 that controls stopping and restarting of the engine 4, a clutch control unit 42 that controls the operation of the clutch 20, a reaction force actuator control unit 43 for driving and controlling the reaction force actuator 25, and a steering actuator control unit 44 that drives and controls the steering actuator 28.

The idle stop control unit 41 performs an idle stop control to stop the engine 4 when all of predetermined idle stop conditions are satisfied and to restart the engine 4 when any one of predetermined restart conditions is satisfied. The idle stop conditions for stopping the engine 4 include that the vehicle speed is equal to or lower than a first value which is a value greater than 0 such as 10 km/h. Therefore, even when the vehicle 1 is traveling, if the vehicle speed falls below the first value, the idle stop control unit 41 may initiate an idle stop operation (provided that other necessary conditions are also met), and stop the engine 4. The idle stop conditions further include that the ignition switch is ON, that the engine rotational speed is equal to or higher than a predetermined value, that the absolute value of the steering angle $|\theta|$ of the steering wheel 11 is equal to or less than a prescribed value (such as 90 degrees), that the throttle opening angle is substantially zero, that the shift position is other than P, R and N, that the brake switch is ON, and the remaining charge of the battery is equal to or greater than a prescribed value. When all of these idle stop conditions are satisfied, the idle stop control unit 41 stops the engine 4. The restart conditions include that the brake switch is turned off, that the throttle opening angle is equal to or greater than a prescribed value, that the shift position is N, R or L, and that the remaining charge of the battery is less than a prescribed value, during an idle stop in each case. When any one of these restart conditions is satisfied, the idle stop control unit 41 restarts the engine 4.

When the engine 4 is started by a vehicle operator, the clutch control unit 42 supplies energization current to the solenoid device 24 to disengage the clutch 20. When the engine 4 is stopped by a vehicle operator, the clutch control unit 42 discontinues the supply of the energization current to the solenoid device 24 to engage the clutch 20. During an idle stop, the clutch control unit 42 continues to supply the energization current to the solenoid device 24 to keep the clutch 20 disengaged.

When the clutch 20 is disengaged, the steering actuator control unit 44 drives and controls the steering actuator 28 so that the front wheels 3 are steered by a steering angle Θ corresponding to the steering angle θ applied to the steering wheel 11. During an idle stop, the steering actuator control unit 44 executes a position keep control whereby the steering actuator 28 is controlled so as to maintain the steering angle Θ of the front wheels as it is if the vehicle speed V is equal to or higher than a second value (5 km/h, for instance) which is higher than the first value (5 km/h). The position keep control may comprise operating the steering motor 29 as an electromagnetic brake by supplying electric current to the steering motor 29 so as to produce a brake torque. Alternatively, the two ends of the steering motor 29 may be connected to each other directly or via a resistor so that the steering motor 29 may function as a dynamic brake.

When the vehicle speed has fallen below the second value, the steering actuator control unit 44 stops the control of the steering motor 29 (whereby neither the normal steering angle control nor the position keep control is executed). This may be achieved by leaving the two ends of the steering motor 29 open, or connecting the two ends of the steering motor 29 directly or via a resistor. When any one of the restart condition is satisfied, and the idle stop control is ended, the idle stop control unit 41 restarts the engine 4, and the steering actuator control unit 44 resumes the steering angle control of the steering motor 29.

The reaction force actuator control unit 43 controls the reaction force motor 26 of the reaction force actuator 25 so as to produce a reaction force torque corresponding to the steering input to the steering wheel 11 when the clutch 20 is disengaged and an idle stop operation is not taking place. During an idle stop operation (in which the vehicle speed V is no higher than 10 km/h), the reaction force actuator control unit 43 does not execute the reaction force control, but executes a dynamic brake control whereby the reaction force motor 26 functions as a dynamic brake.

Figure 4:
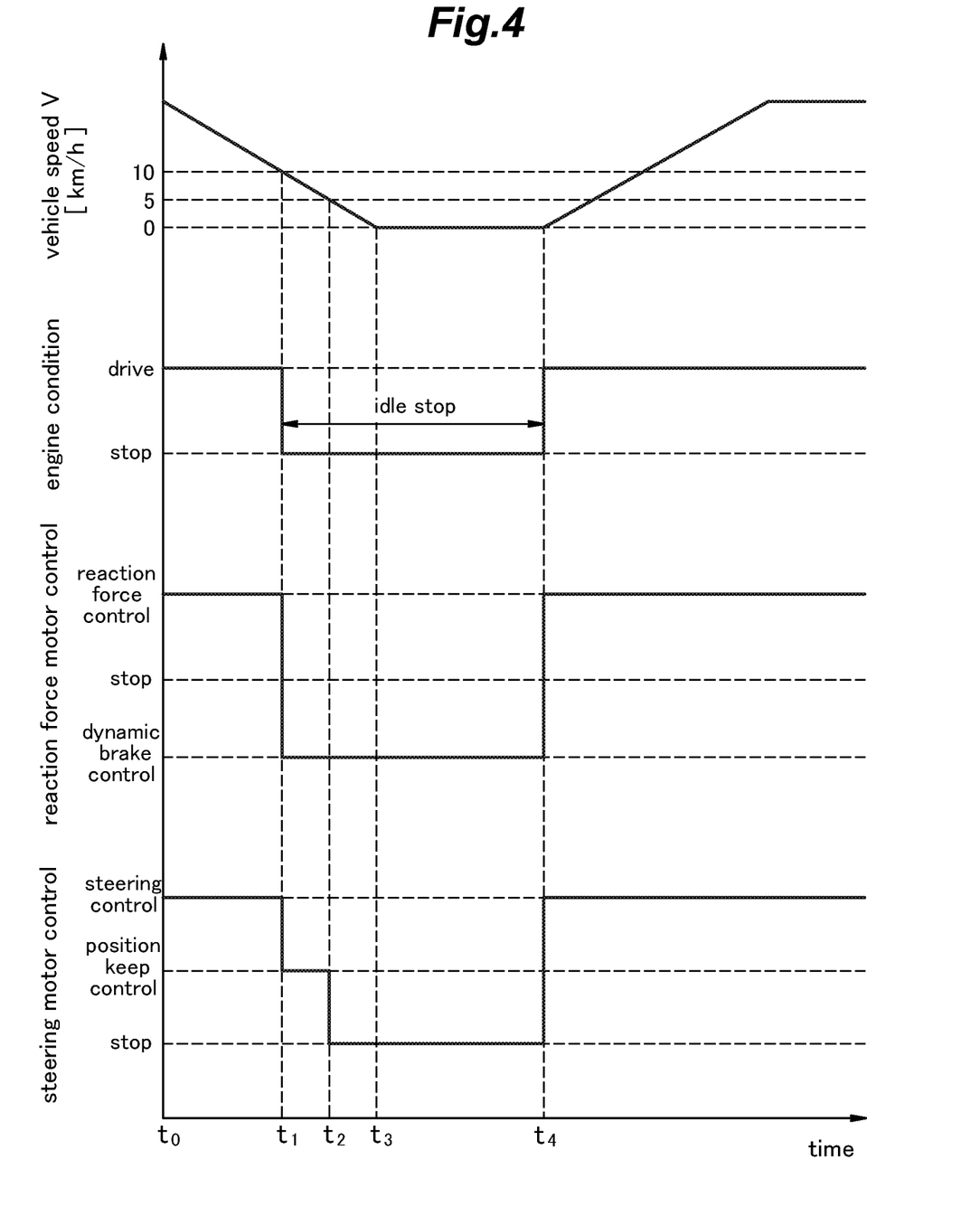
FIG. 4 is a time chart showing a typical control process executed by the control system according to changes in the vehicle speed.

FIG. 4 is a time chart showing the mode of operation of the control unit 40 when the vehicle travelling at a relatively high speed comes to a stop, and starts traveling again. At time point t0 where the vehicle 1 is traveling at a vehicle speed V higher than the first value (10 km/h), the idle stop control unit 41 drives the engine 4, the reaction force actuator control unit 43 executes the reaction force control for the reaction force motor 26, and the steering actuator control unit 44 executes the steering angle control for the steering motor 29.

At time point t1 where the vehicle speed V goes below 10 km/h owing to a braking action taken by the vehicle operator by depressing the brake pedal, the idle stop control unit 41 stops the engine 4 (it is supposed that the remaining idle stop conditions are all satisfied). Thus, time point t1 is a time point at which the vehicle speed V falls below 10 km/h, and the idle stop control unit 41 has initiated an idle stop operation. At time point t1, the reaction force actuator control unit 43 controls the reaction force actuator 25 so as to terminate the reaction force control, and initiates a dynamic brake control. At time point t1, the steering actuator control unit 44 controls the steering actuator 28 so as to stop the steering angle control, and initiate the position keep control.

At time point t2 where the vehicle speed V decreases further, and falls below 5 km/h, the steering actuator control unit 44 stops the control of the steering actuator 28 (whereby neither steering angle control nor the position keep control is performed). At this time, the reaction force actuator control unit 43 continues the dynamic brake control. At time point t3, the vehicle speed V is reduced to zero, and the vehicle 1 comes to a stop. At time point t4 where the brake pedal is released by the vehicle operator, one of the restart conditions is satisfied so that the engine is restarted, and the vehicle 1 can be started off. At time t4 where the restart condition is satisfied, the idle stop control unit 41 restarts the engine 4. As a result, the vehicle 1 transitions from the idle stop condition to the normal engine drive condition. Since the idle stop control unit 41 terminates the idle stop operation at time point t4, the reaction force actuator control unit 43 commands the reaction force actuator 25 to terminate the dynamic brake control, and resume the reaction force control. Also, at time point t4, the steering actuator control unit 44 commands the steering actuator 28 to resume the steering angle control.

As discussed above, during the time interval between t1 and t2, the idle stop control unit 41 executes an idle stop operation, and the vehicle speed V decreases from the first value (10 km/h) to the second value (5 km/h). As soon as the vehicle speed V falls below the first value (10 km/h), the control unit 40 commands the steering actuator control unit 44 to terminate the normal steering control, and execute the position keep control whereby the steering actuator 28 maintains the steering angle Θ of the front wheels 3, and commands the reaction force actuator control unit 43 to terminate the reaction force control, and controls the reaction force actuator 25 so as to have the reaction force motor 26 function as a dynamic brake. The position keep control is performed by supplying electric power to the steering actuator 28 to produce a braking torque that resists steering of the front wheels 3.

As the vehicle speed V is further reduced, and falls below the second value (5 km/h) at time point t2, the control unit 40 commands the steering actuator control unit 44 to terminate the position keep control. At this time, the two ends of the steering motor 29 may be connected to each other directly or via a resistor, or, alternatively, the two ends of the steering motor 29 may be kept open. In either case, no electric current is supplied to the steering motor 29. At the same time, the control unit 40 commands the reaction force actuator control unit 43 to control the reaction force actuator 25 so as to have the reaction force motor 26 continue functioning as a dynamic brake.

As a result, power consumption is reduced, and the likelihood of the remaining charge of the battery falling below the prescribed threshold value (which is one of the restart conditions) is reduced so that the possibility of invoking an engine restart can be minimized. Also, the deviation between the steering angle Θ of the front wheels 3 and the steering angle θ of the steering wheel 11 that could be caused by the steering of the front wheels 3 by road surface irregularities can be minimized.

During the time interval between t2 and t4 where the idle stop control unit 41 is executing an idle stop operation, and the vehicle speed V is below 5 km/h, the steering actuator control unit 44 ceases the control of the steering actuator 28. Although the position keep control is terminated, the vehicle speed V is so low that any unexpected steering of the front wheels 3 by road surface irregularities can be avoided, and this prevents the vehicle 1 from demonstrating any unexpected behavior.

During the time interval between t1 and t2, the steering actuator 28 positively prevents a deviation between the steering angle θ and the steering angle Θ. During the time interval between t2 and t4, the vehicle speed V is so low that the likelihood of a deviation between the steering angle θ and the steering angle Θ is minimized. Furthermore, the reaction force actuator control unit 43 maintains the reaction force created by a dynamic brake during the whole duration of the idle stop operation, and this also helps to minimize the deviation between the steering angle θ and the steering angle Θ.

As discussed above, the reaction force actuator control unit 43 causes a steering reaction force to be produced by using a dynamic brake even during an idle stop operation, but may not prevent the turning of the steering wheel 11 to some extent. Therefore during an idle stop, some deviation may be produced between the steering angle θ and the steering angle Θ.

To mitigate this problem, the restart conditions for the idle stop control unit 41 include that the change Δθ in the steering angle θ is equal to or greater than a prescribed engine restart threshold value Δθth. The restart conditions for the idle stop control unit 41 may further include that the steering torque T is greater than a prescribed value (2 Nm, for instance), and that the steering angular speed dθ/dt or the time derivative of the steering angle θ is equal to or greater than a prescribed value (90 degs/sec, for instance). As mentioned above, if any one of the restart condition is satisfied, the idle stop control unit 41 restarts the engine 4.

Once the idle stop is terminated, and the engine 4 is restarted, the steering actuator control unit 44 resumes the control of the steering actuator 28 so that the steering angle Θ of the front wheels 3 changes according to the steering angle θ. As a result, the steering angle Θ is prevented from deviating from a value corresponding to the steering angle θ beyond the engine restart threshold value Δθth so that the vehicle 1 is prevented from starting off in a direction unexpected by the vehicle operator.

Figure 5A:
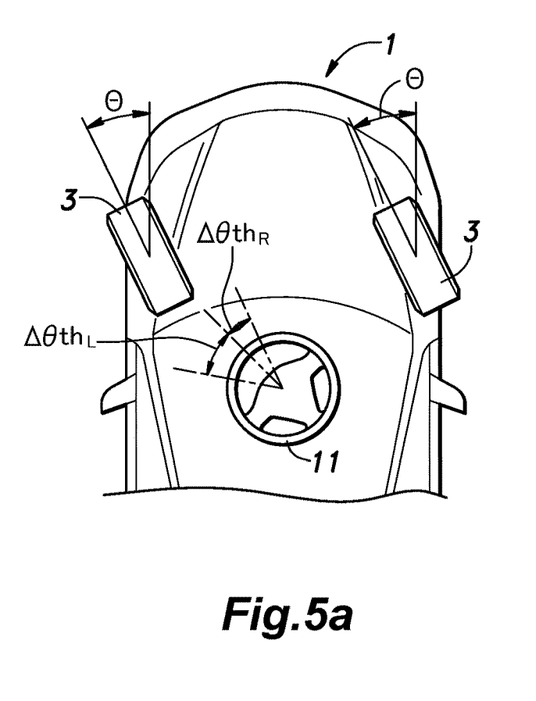
FIGS. 5a to 5c are schematic views illustrating restart conditions of an idle stop operation performed by the control system.
Figure 5B:
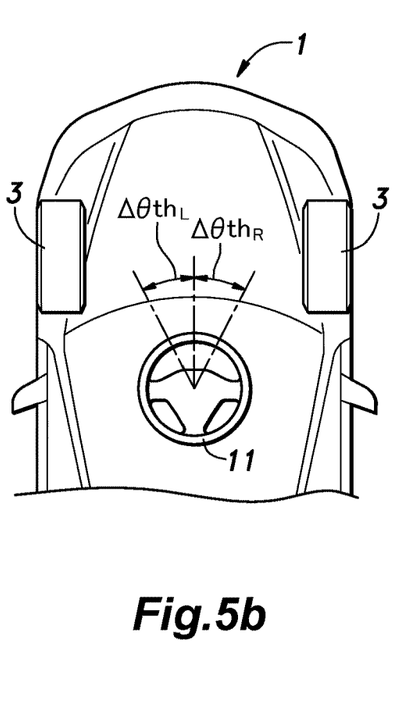
Figure 5C:
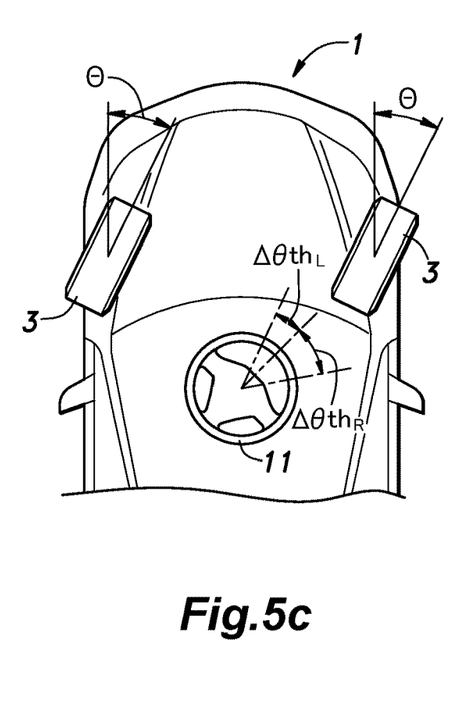

FIG. 5 is an explanatory diagram of the restart condition of the idle stop control performed by the control unit 40. FIG. 5a shows a case where the front wheels 3 are steered to the left at the start of the idle stop, FIG. 5b shows a case where the front wheels 3 are substantially in a straight ahead position when the idle stop is started, and FIG. 5c shows the case where the front wheels 3 are steered to the right when the idle stop is started.

As shown in FIG. 5b, suppose that when the idle stop is started, the front wheels 3 are in a substantially straight ahead position, or that the absolute value |θs| of the steering angle θ of the steering wheel 11 at the start of the idle stop (initial steering angle θs) is equal to or smaller than a predetermined value (20 degrees, for example). In this case, the engine restart threshold value Δθth is selected as a base value (30 degrees, for example) without regard to if the steering wheel 11 is turned either to the left or to the right. Therefore, in this case, if the steering wheel is turned by more than the value corresponding to the base value (30 degrees) in either direction, the idle stop is terminated, and the engine is restarted.

As shown in FIG. 5a, suppose that when the idle stop is started, the front wheels 3 are directed to the left, and the initial steering angle θs is greater than the predetermined value (20 degrees, in this case). In this case, the engine restart threshold value Δθth is selected so that the engine restart threshold value ΔθthL for a leftward steering (an additive steering angle) is greater than the engine restart threshold value ΔθthR for a rightward steering (a subtractive steering angle). More specifically, the engine restart threshold value ΔθthL for a leftward steering (an additive steering angle) is greater than the base value (45 degrees, for example) while the engine restart threshold value ΔθthR for a rightward steering (a subtractive steering angle) is smaller than the base value (15 degrees, for example).

As shown in FIG. 5c, suppose that when the idle stop is started, the front wheels 3 are directed to the right, and the initial steering angle θs is greater than the predetermined value (20 degrees, in this case). In this case, the engine restart threshold value Δθth is selected so that the engine restart threshold value ΔθthR for a rightward steering (an additive steering angle) is greater than the engine restart threshold value ΔθthL for a leftward steering (a subtractive steering angle). More specifically, the engine restart threshold value ΔθthR for a rightward steering (an additive steering angle) is greater than the base value (45 degrees, for example) while the engine restart threshold value ΔθthL for a leftward steering (a subtractive steering angle) is smaller than the base value (15 degrees, for example).

Figure 6:
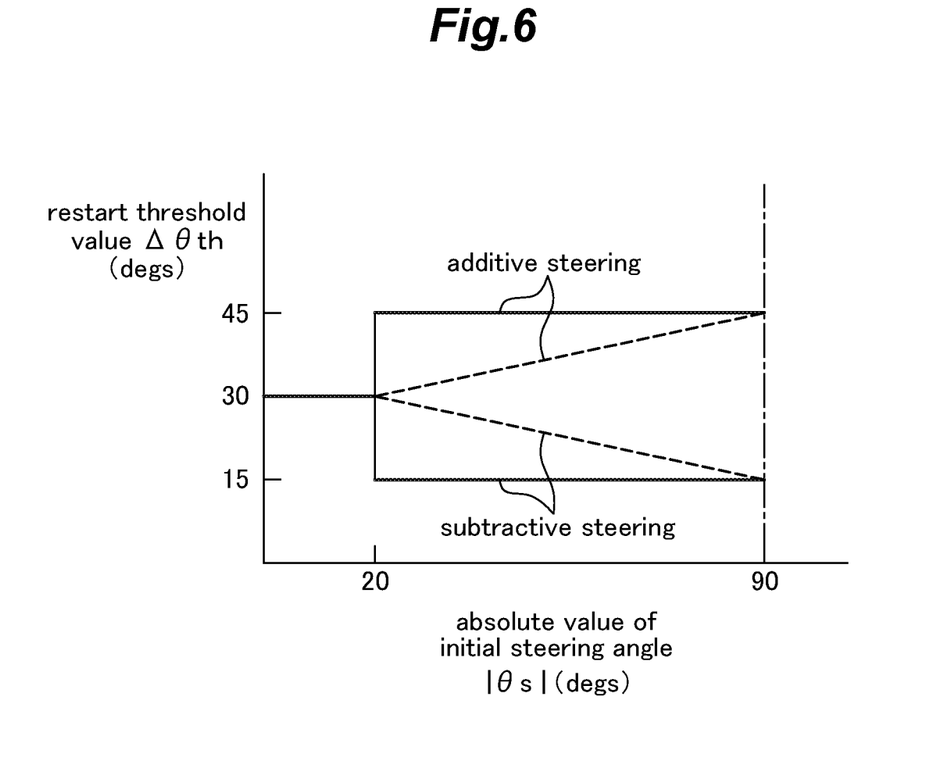
FIG. 6 is a graph showing the relationship between the initial steering angle and the engine restart threshold value.

FIG. 6 is a graph showing the relationship between the steering angle of the steering wheel 11 at the start of an idle stop (initial steering angle θs) and the engine restart threshold value Δθth. The engine restart threshold value Δθth (ΔθthL or ΔθthR) may be varied discretely in relation with the initial steering angle θs as indicated by the solid lines in FIG. 5, but may also be increased in proportion to an increase in the initial steering angle θs for the additive steering and decreased in proportion to an increase in the initial steering angle θs for the subtractive steering as indicated by the dotted lines in FIG. 5.

Figure 7:
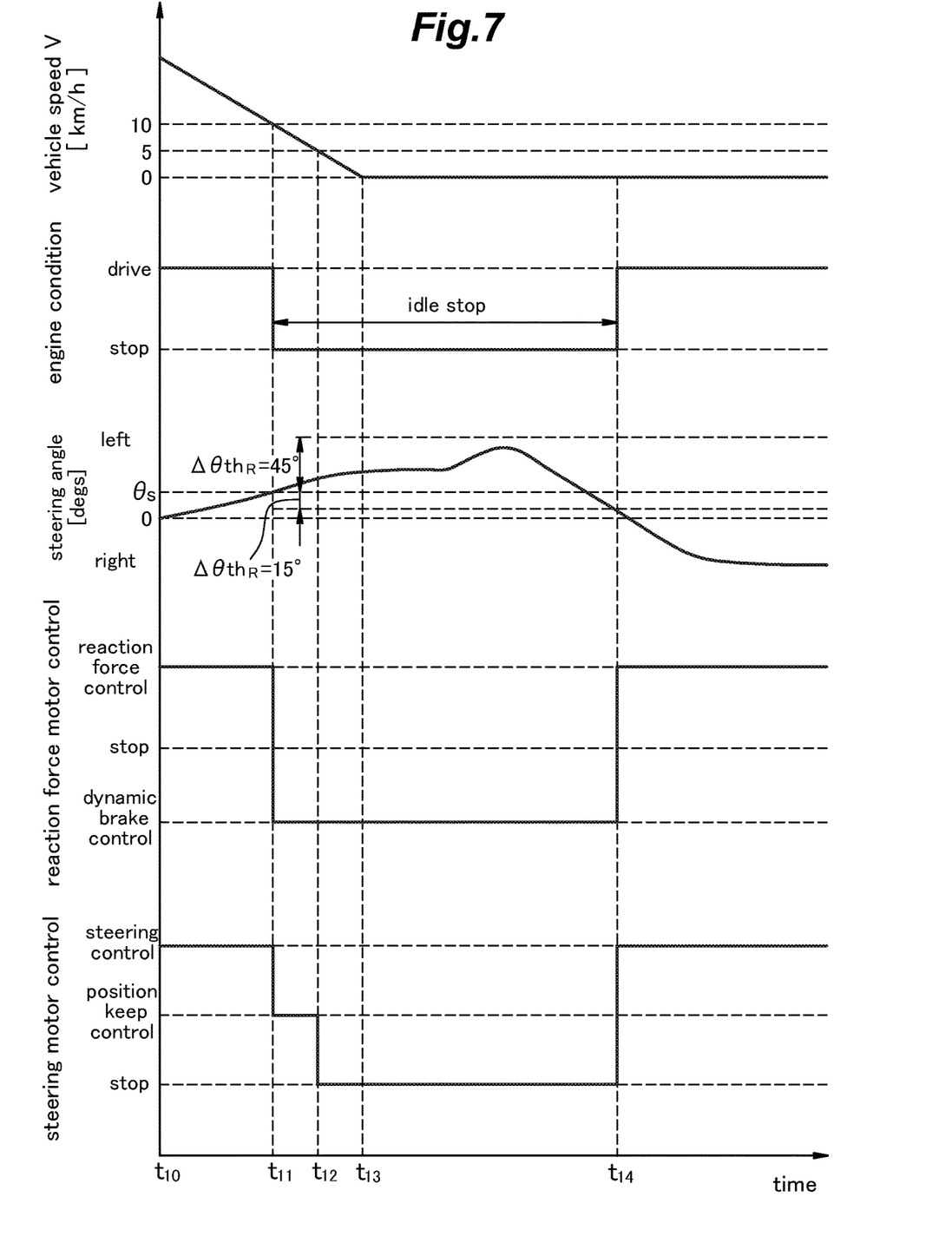
FIG. 7 is a time chart showing a typical control process executed by the control system according to changes in the vehicle speed and the steering angle.

FIG. 7 is a time chart showing a typical control process executed by the control unit 40 according to changes in the vehicle speed and the steering angle. This time chart is similar to that of FIG. 4, but additionally includes a time history of the steering angle θ.

The steering angle θ is being turned leftward at the onset of an idle stop operation. Therefore, at time t11 or when the idle stop operation is started, the engine restart threshold value ΔθthL for additive steering is 45 degrees and the engine restart threshold value ΔθthR for subtractive steering is 15 degrees.

The steering angle θ continues to increase in the leftward direction even after the idle stop operation is started, but does not exceed the engine restart threshold value ΔθthL (=45 degrees) for additive steering. Therefore, the engine 4 is not restarted. However, some time after the idle stop operation is started, the steering wheel 11 is turned rightward or a subtractive steering is performed, and the rightward increase in the steering angle exceeds the engine restart threshold value ΔθthR (=15 degrees) for subtractive steering at time point t14. As a result, the engine 4 is restarted. Thereafter, the normal steering control is executed by the steering actuator control unit 44 so that the deviation between the steering angle θ of the steering wheel and the steering angle Θ of the front wheels 3 is eliminated.

In this manner, by restarting the engine 4 upon detecting a subtractive steering of a relatively small angle (15 degrees), the vehicle is prevented from being steered in an unexpected direction when an idle stop operation is terminated. By restarting the engine 4 only upon detecting a additive steering of a relatively large angle (45 degrees), the likelihood of unnecessarily restarting the engine 4 can be reduced, and this contributes to an improved fuel economy.

In particular, by varying the engine restart threshold value $\Delta\theta$th in dependence on the initial steering angle $\theta$s as indicated by the dotted lines in FIG. 6, the advantages mentioned above can be enhanced even further.

In the foregoing embodiment, the engine restart threshold value $\Delta\theta$th, the initial steering angle $\theta$s and the predetermined absolute value of the initial steering angle $\theta$s were evaluated in terms of the steering angle $\theta$ of the steering wheel 11, but may also be evaluated in terms of the steering angle $\Theta$ of the front wheels 3 or other values associated with either of these steering angles such as the linear position of the rack and the angular position of the pinion of the rack and pinion steering gear box 14.

Although the present invention has been described in terms of a preferred embodiment thereof, it is obvious to a person skilled in the art that various alterations and modifications are possible without departing from the scope of the present invention.

The invention claimed is:

1. A control system for a vehicle incorporated with a steer by wire steering device for steering a road wheel by using a steering motor according to a steering input applied to a steering member, the steering motor being mechanically decoupled from the steering member, the control system comprising:
an idle strop control unit for starting an idle stop operation to stop an engine mounted on the vehicle when a plurality of prescribed idle stop conditions are satisfied, and restarting the engine when a prescribed restart condition is satisfied;
a steering input angle sensor for detecting a steering input angle of the steering member;
a reaction force motor for supplying a steering reaction force to the steering member;
a steering output angle sensor for detecting a steering output angle of the road wheel;
a vehicle speed sensor for detecting a traveling speed of the vehicle;
a steering motor control unit for controlling the steering motor so as to cause the road wheel to be steered at an angle commanded by the steering input angle of the steering member; and
a reaction force motor control unit for controlling the reaction force motor to generate a reaction force applied to the steering member;
wherein the idle stop conditions include that the traveling speed of the vehicle detected by the vehicle speed sensor has fallen below a first value; and
wherein, when the vehicle speed is lower than the first value but higher than a second value which is lower than the first value in the idle stop operation, the steering motor control unit executes a position keep control whereby the steering motor is electrically braked, and the reaction force motor control unit operates the reaction force motor as a dynamic brake.

2. The control system according to claim 1, wherein the steering motor control unit electrically brakes the steering motor by supplying electric current thereto.

3. The control system according to claim 1, wherein the steering motor control unit electrically brakes the steering motor by operating the steering motor as a dynamic brake.

4. The control system according to claim 1, wherein, when the vehicle speed has fallen below the second value in the idle stop operation, the steering motor control unit terminates the position keep control.

5. The control system according to claim 4, wherein, when the vehicle speed has fallen below the second value in the idle stop operation, the reaction force motor control unit continues to operate the reaction force motor as a dynamic brake.

6. The control system according to claim 5,
wherein the restart condition includes a change of the steering input or output angle from a start of the idle stop operation being greater than an engine restart threshold value; and
wherein, if an absolute value of the steering input or output angle at the start of the idle stop operation is equal to or greater than a prescribed value, the engine restart threshold value for a steering operation to increase the steering input angle is given as a first value, and the engine restart threshold value for a steering operation to decrease the steering input angle is given as a second value smaller than the first value.

7. The control system according to claim 6, wherein if the absolute value of the steering input or output angle at the start of the idle stop operation is smaller than the prescribed value, the engine restart threshold value is given as a base value intermediate between the first value and the second value.

8. The control system according to claim 6, wherein the first value and the second value are fixed values without regard to the absolute value of the steering input or output angle at the start of the idle stop operation.

9. The control system according to claim 6, wherein the first value increases with an increase in the absolute value of the steering input or output angle at the start of the idle stop operation.

10. The control system according to claim 9, wherein the second value decreases with an increase in the absolute value of the steering input or output angle at the start of the idle stop operation.

11. The control system according to claim 1, wherein the first value is greater than zero.

12. The control system according to claim 1, wherein the second value is greater than zero.

* * * * *